United States Patent Office.

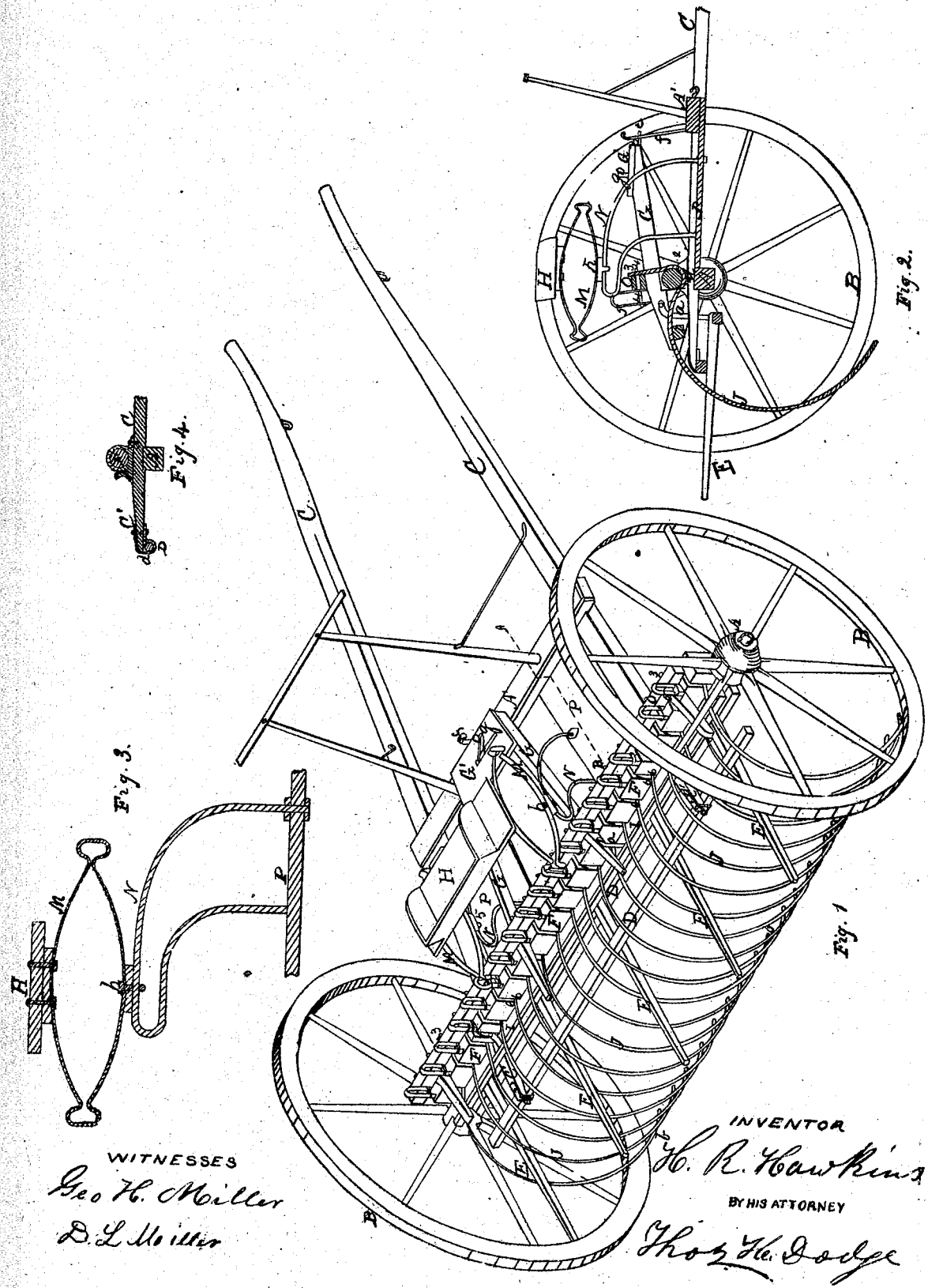

HORACE R. HAWKINS, OF AKRON, OHIO.

Letters Patent No. 75,905, dated March 24, 1868.

---

IMPROVEMENT IN HORSE-RAKES.

---

*The Schedule referred to in these Letters Patent and making part of the same.*

---

KNOW ALL MEN BY THESE PRESENTS:

That I, HORACE R. HAWKINS, of Akron, in the county of Summit, and State of Ohio, have invented certain new and useful Improvements in Horse-Rakes; and I do hereby declare that the following is a full, clear, and exact description of the same, reference being had to the accompanying drawings, forming a part of this specification, in which—

Figure 1 represents a perspective view of a "Hawkins" horse-rake, with my present improvements applied thereto.

Figure 2 represents a longitudinal central section through one of the teeth and other parts of the machine, the line of section being indicated by red line A B, fig. 1; and Figure 3 represents a section through one of the seat-springs, and the curved stand which supports one end of the same, together with a part of the platform P, to which the stand is fastened.

To enable those skilled in the art to which my invention belongs to make and use the same, I will proceed to describe it.

In the drawings, the part marked A is the main axle, which is supported by the wheels B B, in the ordinary manner. The shafts C C are fastened to the main axle, and extend back to support the vibrating-frame D, to which the clearing-fingers E are fastened. The rake-head F is hinged, or fitted to turn in circular bearings 7, fastened to the top of the shafts C C, just above the main axle, so that the weight of the rake-head is supported by the axle A, in a manner which tends to equalize the balance of the machine. The arms G G, which support the driver's foot-board G', are attached to the rake-head F, and extend back, and support the cross-rail or bar I, upon which the rake-teeth J rest. The front of frame D is connected, by hinged connections $a$ $a$, to the rear ends of arms G G, upon the front of which rests the foot-board G'. From the cross-piece A' rises the stand $f$, provided with notches, into which the catch-bar $e$, fastened to the under side of the foot-board G', is forced, by a spring properly arranged under the foot-board for that purpose. The notches in stand $f$ are so made that they will allow the catch-bar $e$ to slide up freely, but will catch and prevent it from descending. A bent lever, $g$, is hinged, and combined with the foot-board in such a manner that its long end, $o$, projects above the board, so that when the driver wishes to raise the curved ends $b$ of teeth J, to discharge the hay, or for any other purpose, he has only to press the upper end of lever $g$ with his foot, when the short bent end of said lever forces the catch-bar $e$ out laterally, so as to clear the notches in the stand $f$, when the foot-board and front of arms G G are easily depressed by the pressure of the driver's foot upon the foot-board G'. When the rake-head F is turned forward, to raise the teeth J, the front of frame D is elevated and the points of the clearing-fingers depressed, frame D being hinged to the rear projecting ends C' C' of shafts C C, as shown at $d$ $d$. The driver's seat, H, is supported upon springs M, fastened to eyes $h$ $h$, which can be moved back and forth upon the curved metal supports N, fastened to the platform P. The rake-head is turned with a series of grooves, 1, and the rake-teeth J, being bent into the form shown in the drawings, are passed under the rake-head, so that their bends, 2, will fit into the grooves 1, upon the under side of the head F, as fully shown in the drawings. The bends 2 of the rake-teeth J are all supported by a wooden bar, $n$, which extends the whole length of the rake-head, and is fastened to the under side of the head, so as to keep the teeth up in place, (see fig. 2 of the accompanying drawings.) The upright ends 3 of the teeth J pass through loops 4, which are fitted in and project through slots in the cross-bar O, and are provided with the staple springs 5, which draw the loops back until the upper ends, 3, of the rake-teeth, strike against the bar O.

When the rake is in operation, if any obstruction happens to be in the path of one or more of the teeth, the springs 5 will yield, and allow the lower ends of the teeth to rise and pass the obstructions. The shoulders 6 on the rake-head keep the teeth in proper position laterally, while bars I and $n$, loops 4, and springs 5, insure their proper vertical positions. With the teeth thus made, and combined with the rake-head, they operate very perfectly, while, in case one breaks, it can be very conveniently replaced.

It will be observed that each tooth is independent in its action, while all of the teeth can be elevated at the same time by the driver, to discharge the hay, as follows: He presses down the end, $o$, of lever $g$, thereby throwing the catch-bar $e$ free from the notches in the stand $f$; then, by a slight pressure of the foot upon the foot-board G', the arms G G are depressed, the rake-head F partially revolved, the curved ends $b$ of the rake-teeth J elevated, while the rear ends of the clearing-fingers E are depressed, thereby preventing the hay from rising with and hanging upon the ends of the rake-teeth. The pressure of the hay against the rake-teeth, owing to the forward motion of the team, aids very much in the operation of discharging the hay; so much so, that the driver has only to exert a gentle pressure upon the foot-board, and that, generally, to complete the elevation of the teeth, and hold them elevated until they pass over the windrow. As soon as the windrow is passed, the driver lifts his foot from the foot-board G', when the teeth fall again into the position shown in the drawings, the catch-bar or latch $e$ slipping into one of the notches in the stand $f$, thereby holding the teeth to their work, until the operation of lifting the teeth to pass the windrow is again repeated, as above described.

Figure 4 represents a section through one of the bearings of the rake-head F and frame D, showing the construction of the strap-hinges, by which head F and frame D are attached to the other parts of the rake.

It will be observed that the teeth are not rigidly attached to the rake-head, but are loosely connected thereto, in such a manner that when their lower ends are elevated by obstructions, the independent springs 5 yield, and let the upper ends of the teeth partially revolve about the rake-head. By this arrangement the teeth are not strained, nor are they liable to break.

Having described my improvements in horse-rakes, what I claim therein as new and of my invention, and desire to secure by Letters Patent, is—

1. The combination, with the rake-head F and bar O, of the teeth J, loops 4, and springs 5, arranged for joint operation, substantially as set forth.

2. The combination, with the rake-head F and the peculiarly-constructed teeth J, of the bars O and $n$, links or loops 4, and springs 5, substantially as and for the purposes set forth.

3. The combination, with the rake-head, of teeth held to the head by springs or their mechanical equivalents, under the arrangement described, whereby the said teeth will be supported, so that when their lower ends are raised by coming in contact with obstructions, their upper ends will partially revolve about the head, substantially as set forth.

H. R. HAWKINS.

Witnesses:
    THOS. H. DODGE,
    EDWARD ORIATT.